US011524974B2

(12) United States Patent
Lintinen et al.

(10) Patent No.: US 11,524,974 B2
(45) Date of Patent: Dec. 13, 2022

(54) AQUEOUS LIGNIN DISPERSIONS AND METHODS OF PREPARING THE SAME (71) Applicant: Aalto University Foundation sr, Aalto (FI)

(72) Inventors: Kalle Lintinen, Aalto (FI); Rahul Prasad Bangalore Ashok, Aalto (FI); Timo Leskinen, Aalto (FI); Yao Xiao, Aalto (FI); Monika Österberg, Aalto (FI); Mauri Kostiainen, Aalto (FI); Pekka Oinas, Aalto (FI); Lauri Rautkari, Aalto (FI); Akio Yamamoto, Aalto (FI); Saara Hautamäki, Aalto (FI); Niko Meri, Aalto (FI)

(73) Assignee: Aalto University Foundation sr, Aalto (FI)

( * ) Notice: Subject to any disclaimer, the term of this patent is extended or adjusted under 35 U.S.C. 154(b) by 0 days.

(21) Appl. No.: 16/758,869

(22) PCT Filed: Oct. 26, 2018

(86) PCT No.: PCT/FI2018/050782
§ 371 (c)(1),
(2) Date: Apr. 24, 2020

(87) PCT Pub. No.: WO2019/081819
PCT Pub. Date: May 2, 2019

(65) Prior Publication Data
US 2020/0255466 A1  Aug. 13, 2020

(30) Foreign Application Priority Data

Oct. 26, 2017  (FI) ...................................... 20175947

(51) Int. Cl.
*C07G 1/00* (2011.01)
*B01J 13/00* (2006.01)

(52) U.S. Cl.
CPC ............ *C07G 1/00* (2013.01); *B01J 13/0021* (2013.01)

(58) Field of Classification Search
CPC .............................. C07G 1/00; C08L 97/005
See application file for complete search history.

(56) References Cited

U.S. PATENT DOCUMENTS

| | | |
|---|---|---|
| 4,957,557 A | 9/1990 | Dimitri |
| 5,008,378 A | 4/1991 | Dimitri |
| 5,730,837 A | 3/1998 | Black et al. |
| 11,033,867 B2* | 6/2021 | Lewis ................. B01F 17/0092 |
| 2010/0204368 A1* | 8/2010 | Benko ...................... C08H 6/00 524/73 |
| 2012/0156389 A1* | 6/2012 | Kotov .................... B82Y 30/00 427/532 |
| 2014/0046041 A1* | 2/2014 | South ...................... D21C 1/04 530/507 |
| 2014/0050924 A1* | 2/2014 | Vermerris ................ C08H 6/00 428/402 |
| 2015/0166836 A1 | 6/2015 | Liu et al. |
| 2015/0183813 A1* | 7/2015 | Eskelinen ................ C08H 6/00 530/507 |
| 2016/0032525 A1* | 2/2016 | Kurple ............... D21C 11/0007 162/16 |
| 2017/0113936 A1* | 4/2017 | Zhang .................... B01J 23/745 |
| 2017/0253740 A1* | 9/2017 | Murai ..................... C08K 5/0025 |
| 2017/0298192 A1* | 10/2017 | Samec ................. C09J 197/005 |
| 2018/0030555 A1* | 2/2018 | Van Tuel .................. C08H 8/00 |
| 2018/0142177 A1* | 5/2018 | Dahlstrand ............... C10L 1/14 |
| 2019/0037837 A1* | 2/2019 | Wurm .................... A01N 25/04 |
| 2019/0062359 A1* | 2/2019 | Stevanovic .............. C08H 8/00 |
| 2020/0071468 A1* | 3/2020 | Friedl ....................... C08H 6/00 |
| 2020/0109157 A1* | 4/2020 | Tomani .................... C08H 6/00 |
| 2020/0157287 A1* | 5/2020 | Nasli Bakir .......... C08L 97/005 |
| 2020/0283684 A1* | 9/2020 | Kouris ..................... C07G 1/00 |

FOREIGN PATENT DOCUMENTS

| | | |
|---|---|---|
| CN | 102947347 A1 | 2/2013 |
| CN | 103254452 A | 8/2013 |
| CN | 103709772 A | 4/2014 |
| EP | 0429723 A1 | 6/1991 |
| EP | 2535378 A1 | 12/2012 |
| WO | WO2013182751 A1 | 12/2013 |
| WO | WO2015199608 A1 | 12/2015 |
| WO | WO2016020383 A1 | 2/2016 |
| WO | WO2016053209 A1 | 4/2016 |

(Continued)

OTHER PUBLICATIONS

Rao et al. (ACS Omega 2017, 2, 2858-2865, available Jun. 27, 2017) (Year: 2017).*
Wei et al. (Green Chem. 2012, 14, 3230-3236) (Year: 2012).*
Frangville et al: Fabrication of Environmentally Biodegradable Lignin Nanoparticles. Chemphyschem Articles, 2012. vol. 13, pp. 4235-4243.

(Continued)

*Primary Examiner* — Liam J Heincer (74) *Attorney, Agent, or Firm* — Laine IP Oy (57) ABSTRACT Method of forming colloidal lignin particles, comprising the step of dissolving lignin in a mixture of organic solvents, feeding of the said solution into water, and forming acolloidal dispersion of lignin. The used solvents are recovered with methods such as distillation and reused in the process. Water is removed from the colloidal dispersion by ultrafiltration and reused in the process. The concentrated colloidal dispersion is dried by spray drying. The invention can be used in applications where the colloidal nature of lignin will afford an advantage over bulk lignin.

21 Claims, 4 Drawing Sheets

(56) References Cited

FOREIGN PATENT DOCUMENTS

WO     WO2016072915 A1     5/2016

OTHER PUBLICATIONS

Lievonen et al: A simple process for lignin nanoparticle preparation. Royal Society of Chemistry, Green Chemistry, 2016. vol. 18, pp. 1416-1422.

Qian et al: Formation of uniform colloidal spheres from lignin, a renewable resource recovered from pulping spent liquor. Royal Society of Chemistry, Green Chemistry, 2014. vol. 16, pp. 2156-2163.

* cited by examiner

AQUEOUS LIGNIN DISPERSIONS AND METHODS OF PREPARING THE SAME

FIELD OF INVENTION

The present invention relates to colloidal lignin particles, as well as to dispersions and concentrates of colloidal lignin particles. In particular, the present invention concerns a method of forming aqueous dispersions and concentrates of colloidal lignin particles.

The invention disclosed herein also relates to the use of colloidal lignin in multiple applications, specifically but not exclusively to those where bulk lignin will not afford the function obtainable by colloidal lignin.

BACKGROUND

Lignin is a major by-product of the pulp industry and is currently used mostly for fuel. The pulp and paper industry alone produces roughly 50 million tons of extracted lignin per year. Several high volume applications of lignin are already studied, such as binders and adhesives, carbon materials, and sources of chemicals. However, the inhomogeneity of non-colloidal lignin limits its use in high-end applications, such as anti-bacterials, controlled drug delivery, functional surface coatings, emulsion stabilizers, filler composites and nanoglues. Colloidal lignin particles (CLPs) can overcome the problem of inhomogeneity and poor dispersibility. Multiple methods for their production have been presented, but most of them consume a significant amount of reagents and energy and/or are so dilute that their large-scale production demands applications associated with high-value end products. For one to take advantage of the low cost of lignin as a raw material, one has to find a way to produce CLPs in a continuous process, with very little energy consumed and preferably with no chemical reactions involved in their preparation. Thus far, no large-scale production method for lignin colloids has been presented that overcomes these obstacles.

Several patents relating to pH precipitation of lignin have been published. However, most of these published methods suffer from the inherent pH instability of the formed lignin colloids. In addition, these methods produce irregular aggregates, not smooth spherical particles.

While cross-linking of the colloids will improve the pH stability, the requirement of a cross-linking step will limit the applications that these colloids can be used. As regards the state-of-the-art, reference is made to International patent specification WO2016020383 A1, European patent application EP 0429723 A1 and publications DOI: 10.1002/cphc.201200537; 10.1039/c3gc42131g and 10.1039/C5GC01436K.

In view of the drawbacks of the technology in the formation of colloidal lignin particles, there is a continuous need to develop methods to produce lignin colloids that will not incur significant costs that would limit their application.

SUMMARY OF THE INVENTION

It is an object of the present invention to provide a method that produces stable colloidal lignin particles quantitatively from bulk lignin without the need of chemical functionalization.

Another object of the invention is to suppress the aggregation of colloidal lignin in dispersions containing high concentrations of colloidal lignin with the use of a co-solvent.

A further object of the invention is to control the particle size of the lignin colloids by the alteration of the solvent environment and lignin concentration. While many applications require the lignin particles to be colloidal in size, i.e. below 1000 nm, many potential uses benefit from a smaller particle size.

A further object of the invention is to fully recover the used solvents and have a minimal consumption of energy in the process. The process is tolerant of water in the recovered solvents, which enables inexpensive methods of solvent recovery.

Another object of the invention is to remove non-soluble matter, such as inorganic components and residual carbohydrates, also referred to as ash, present in most types of lignin by precipitating it from the organic lignin solution.

A fourth object of the invention is that the excess water in the colloidal lignin particle dispersions can be removed by ultrafiltration, thus minimizing the need of energy intensive evaporation of water.

A fifth object of the invention is that the concentrated colloidal lignin particles can be dried with spray drying to yield water-free lignin particles. The particles can be re-dispersed in water or another medium without a significant change in particle diameter.

Finally, it is an object to show applications where the colloidal lignin particles can be used in. While these applications are by no means the only possible ones for these particles, they present an example of their use in multiple applications.

The present invention is based on the finding that colloidal lignin particles are formed by precipitating lignin with water from its solvent mixture by adding an amount of water, i.e. by increasing the molar ratio of water-to-solvent, in a way that stable aqueous dispersion of colloidal lignin particles is achieved. Lignin solution can be added into water or water into the lignin solution.

Further, the present invention is based on the idea that while lignin, such as LignoBoost lignin or modified lignin, is extremely soluble in some organic solvents, such as tetrahydrofuran (THF), the addition of a concentrated organic solvent solution of lignin into water will result in the fusing of the forming colloidal lignin particles into aggregates. When a fraction of the THF solvent is replaced with a co-solvent, such as but not limited to ethanol, the concentration of lignin can be raised considerably without the aggregation of the forming colloidal particles.

More specifically, the present invention is characterized by what is stated in the characterizing parts of the independent claims.

The present invention achieves considerable advantages. Thus, lignin can be quantitatively dissolved into an organic solvent or a solvent mixture at a high concentration.

By using a solvent having a lower boiling point than water, efficient solvent recovery can be achieved by distillation. By contrast, the recovery of a solvent with a high boiling point by evaporation is not economically feasible.

The method can be used for various kinds of lignins. Examples of the types of lignins suitable for the process are any lignin soluble at concentrations of at least 5 wt. %, preferably at concentration of 10 wt. % or more, in at least one organic solvent. Such lignins are softwood kraft lignin, hardwood kraft lignin and plant lignin. The lignin can also be sourced from a biorefinery. Further the lignin can comprise a fraction of the lignin present in the raw-material, such as lignocellulosic material. Such fractions are represented for example by low-molecular lignin and high-molecular lignin.

Numerous other variations and modifications in the invention as illustrated in the specific examples will be apparent to those skilled in the art, and hence it is not intended that the invention be limited to the examples but only as required by the spirit and scope of the appended claims.

Examples of the organic solvents for the dissolution of lignin is any organic solvent miscible in water and capable of dissolving at least one type of lignin at concentrations of at least 5 wt. %, preferably at concentration of 10 wt. % or more, are tetrahydrofuran and others, such as ethanol, dimethyl sulfoxide, acetic acid and dioxane.

Numerous other variations and modifications in the invention as illustrated in the specific examples will be apparent to those skilled in the art, and hence it is not intended that the invention be limited to the examples but only as required by the spirit and scope of the appended claims.

The used co-solvent can be any solvent miscible in water and capable of suppressing aggregation of lignin colloids at high lignin concentrations. Short to medium chained alcohols are known to be efficient co-solvents in prior art. Specifically the use of ethanol is preferred due to its low price and safety. Methanol works efficiently as well and can easily be recovered. Examples of other such solvents are n-propanol, isopropanol, n-butanol, isobutanol and tert-butanol.

Numerous other variations and modifications in the invention as illustrated in the specific examples will be apparent to those skilled in the art, and hence it is not intended that the invention be limited to the examples but only as required by the spirit and scope of the appended claims.

Next, embodiments will be examined more closely with the aid of a detailed description with reference to the appended drawings.

DETAILED DESCRIPTION OF EMBODIMENTS

Herein, the term colloidal lignin particle (CLP; plural, CLPs) refers to lignin material that does not sediment in a fluid upon holding still for at least two hours. Moreover, CLPs can be passed through a filter membrane with a particle retention value of less than 15 micrometers, preferably less than 2 micrometers, in particular less than 1 micrometer. The term lignin nanoparticle is used as a synonym to CLP.

Based on the above discussion a preferred embodiment encompasses a process, where lignin is dissolved in a mixture of solvents, which both enable high solubility of lignin and suppress aggregation in colloid formation. The colloids are formed upon the addition of the lignin solution into water or upon the addition of water into the lignin solution, respectively.

Preferably, the added water is vigorously mixed to ensure that after feeding of the lignin solution the ratio between water and solvent where colloidal lignin particles are stable is reached as fast as possible, thus preventing the aggregation of lignin.

In one embodiment, the ratio of water to the solvent will be adjusted so that colloids are stable after the lignin solution is fully mixed with water. Preferably, the ratio of water to the solvent is at least 1:1, preferably it is in the range of 3:2-7:1.

According to one embodiment, the mixture of solvents comprises at least two organic solvents.

In preferred embodiment a mixture of solvents include an organic solvent and a co-solvent. The ratio of solvent and co-solvent can be adjusted to maximize the concentration of colloidal lignin particles in the final dispersion. However, the recovery of the solvent or co-solvent might incur a higher cost than that obtainable by the maximization of the colloidal lignin particle concentration. In this case solvent ratio may be adjusted to account for the cost of the solvent recovery.

According to one embodiment, the ratio of solvent and co-solvent is in the range of 1:3-3:1, preferably the ratio is about 1:1.

According to one embodiment, the organic solvent is cyclic ether, such as tetrahydrofuran.

According to preferred embodiment, the co-solvent is short to medium chained alcohol, i.e. selected from the group of alcohols containing 1 to 10, in particular 1 to 6, for example 1 to 4 carbon atoms. Such alcohols are for example ethanol and methanol.

In preferred embodiment, the mixture of organic solvents consists of tetrahydrofuran together with ethanol or methanol or together with a combination of ethanol and methanol.

According to one embodiment, lignin can also be dissolved in a mixture of solvents and water. However, the mixture can not include water in an amount to prevent the dissolution of lignin. Preferably, the amount of water in the mixture is less than 50 wt. %, for example 10-40 wt. %, such as 30 wt. %.

Stable colloidal lignin dispersion of the present invention is obtained by feeding a solution formed by lignin dissolved in mixture of at least two organic solvents into water.

The minimum water content in the dispersion that enables stable colloids depends on the type of the lignin and the types of solvents used, but in one embodiment it is above 65 wt. %, more preferably above 75 wt. %.

According to one embodiment, lignin dissolved in a mixture of at least one organic solvent and a co-solvent is dispersed in water to form a dispersion of colloidal lignin particles, wherein the concentration of water in the dispersion is more than 50 wt. %, in particular at least 65 wt. %, preferably above 75 wt. %.

According to one embodiment, the amount of colloidal lignin particles in a stable dispersion is at least 1.0 wt. %, preferably at least 1.5 wt. %, more preferably at least 2.0 wt. %, such as 2.8 wt. %.

According to preferred embodiment, an average colloidal lignin particle diameter is below 400 nm, preferably below 300 nm, for example about 200 nm.

Preferably, the formed colloidal lignin particles are of generally spherical shape or exhibit a rotational symmetrical shape akin to that of spheres or ellipsoids.

According to one embodiment, colloidal lignin particles of the present invention have a concentration of hydrophilic functional groups on the surface making the particles stable in aqueous media.

In general, very dilute dispersions, both with and without a co-solvent, produce colloidal lignin nanoparticles with an average diameter of ca. 70 nm. When lignin concentration is increased while using a co-solvent, the colloidal particle diameter is raised to ca. 200 nm. Whereas, when lignin concentration is increased without the use of a co-solvent, part of the lignin precipitates as aggregates, while the average particle size of the colloidal fraction is raised to ca. 400 nm.

Thus, according to the present invention, the formed lignin particles remain in the colloidal range with an average diameter of the particles being below 400 nm, and the desired average particle size can be obtained with good repeatability.

One embodiment therefore comprises a stable aqueous colloidal lignin particle dispersion comprising at least 1.0 wt. % colloidal lignin particles, which have an average diameter below 400 nm, Thus, the organic solvent can be removed before the dispersion is used to provide a pure dispersion of CLPs in water.

Figure 1:
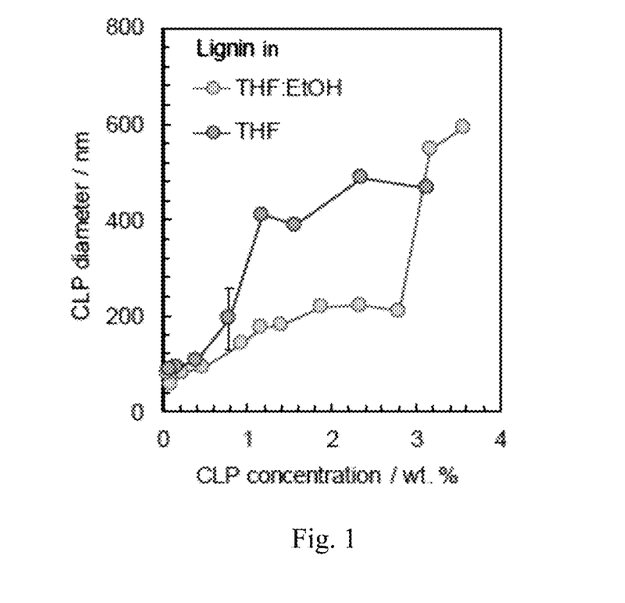
FIG. 1 is a graphical depiction showing CLP concentration in wt. % vs. CLP diameter in nm for one solvent mixture and one pure solvent.

FIG. 1 shows the difference between colloidal lignin particles prepared from a THF solution with and without the co-solvent ethanol, and the relation of lignin concentration and solvent environment on the average lignin diameter. The formed lignin particles remain colloidal up to 2.8 wt. % lignin in the solvent mixture, when a solvent mixture of THF and ethanol are used. The formed lignin particles remain colloidal only up to 0.8 wt. %, when lignin in only THF is used.

Figure 2:
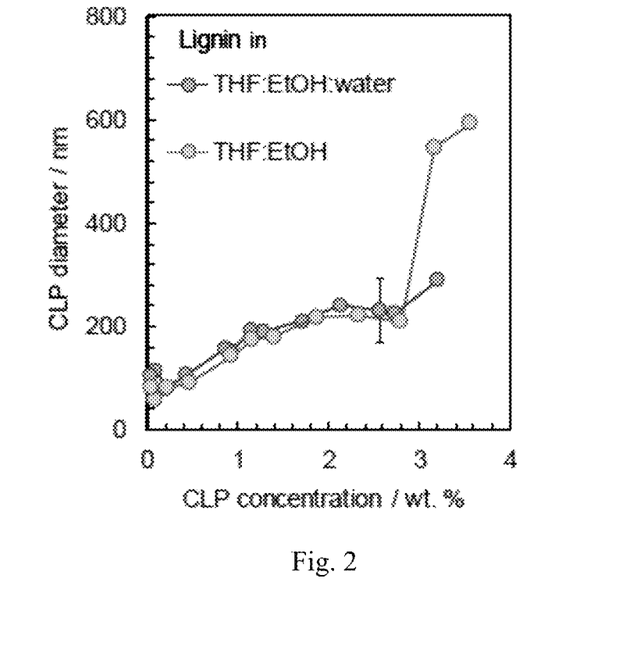
FIG. 2 is a similar graphical depiction showing CLP concentration in wt. % vs. CLP diameter in nm for a solvent mixture in water and in a solvent mixture.

FIG. 2 shows that when colloidal lignin particles are prepared from a lignin solution in a mixture of THF, ethanol and 30 wt. % water, the colloid size is unaffected over those prepared from a lignin solution in a mixture of THF and ethanol, when the water content of the final dispersion is kept a constant 76 wt. % of the solvents.

Figure 3:
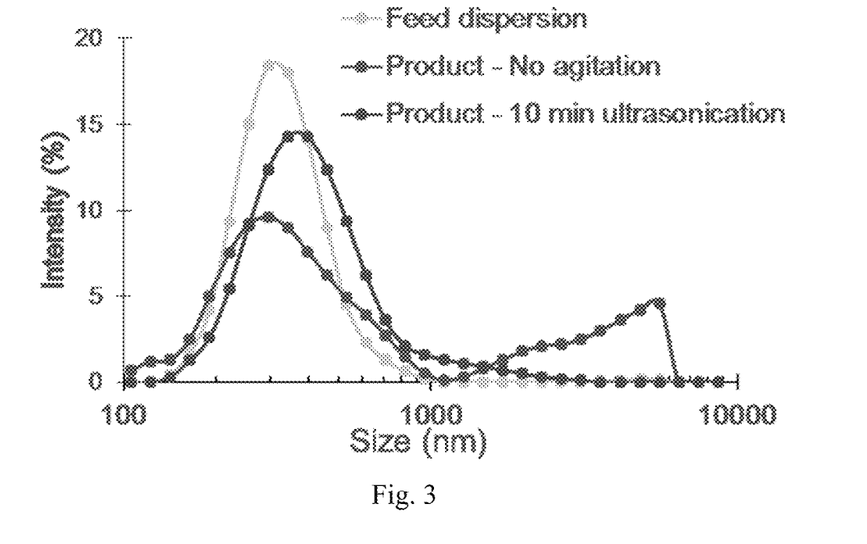
FIG. 3 shows that dry colloidal lignin particles can be redispersed in water without significant difference in particle diameter.

FIG. 3 shows that dry colloidal lignin particles can be redispersed in water without significant difference in particle diameter.

According to preferred embodiment, types of lignin suitable for the process are any lignin soluble at concentrations of at least 5 wt. %, preferably at concentrations of 10 wt. % or more in at least one organic solvent. Such lignins are for example softwood kraft lignin, hardwood kraft lignin and plant lignin.

According to one embodiment, lignin is obtained from a lignocellulosic raw-material by dissolution in an alkaline medium or in an organic medium. In particular the lignin is isolated from black liquor of pulping of a lignocellulosic raw-material. Further, lignin can be obtained from black liquor by precipitation and by separation of the precipitated lignin.

Preferably a LignoBoost lignin is used. Such lignin can be obtained from black liquor which is obtained from evaporation and whose pH is lowered with $CO_2$. The precipitated lignin is dewatered with a filter press. The lignin is then redissolved in spent wash water and acid. The resulting slurry is once again dewatered and washed, with acidified wash water, to produce cakes of lignin, virtually pure. The lean liquor is returned to the liquor cycle.

According to further embodiment, lignin can be functionalized, for example methylolated, before formation of colloids, wherein colloidal lignin particles comprise lignin which is modified with functional groups. In particular, the colloidal lignin particles comprise lignin in which at least a part of the phenolic hydroxyl groups have chemically modified.

Functionalized lignin is neutralized with acid and washed to remove the formed salt. Such treated functionalized lignin, dissolved into organic solvents, self-assembles into CLPs upon addition of solution into water according to the present invention.

According to one embodiment, a continuous flow tubular reactor is used for the formation of uniform dispersion of colloidal lignin particles. Addition of lignin solution into water is performed in the reactor.

Figure 5:
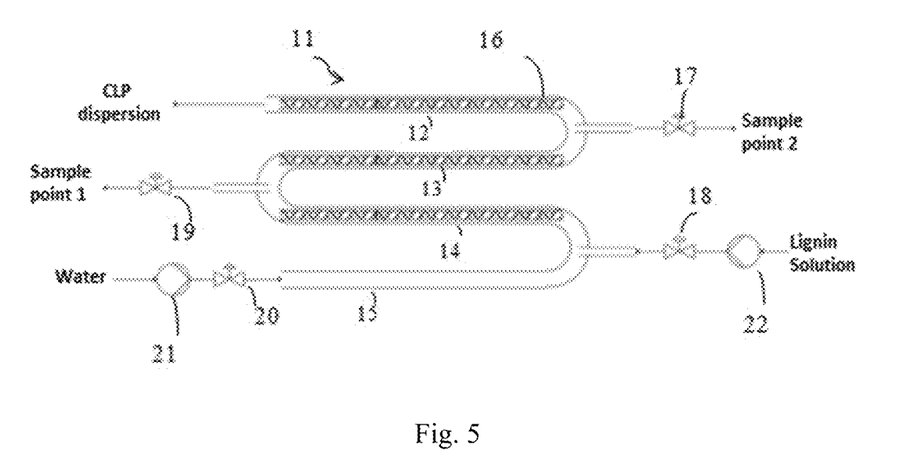
FIG. 5 is a simplified depiction of a continuous flow reactor set-up.

Turning now to the FIG. 5 it can be noted that according to one embodiment, a continuous flow tubular reactor 11 consists of 1 to 6 tubes with the total tube length being 1 to 6 meters, for example of 4 tubes (reference numerals 12 to 15) with the total tube length being 4 meters. Preferably, the length of each tube is about 1 meter. There are mixing elements 16 incorporated within the tubes to aid in the formation of a homogeneous dispersion of colloidal particles. According to one embodiment, 1 to 4, for example two, sample points are provided for checking the consistency of the dispersion.

Typically, there are two inlets in the reactor, one for the water and the other for the lignin solution.

Valves have been given the reference numerals 17 to 20, and the pumps reference numerals 21 and 22.

According to one embodiment, water inlet is at one end of the first tube and lignin inlet at the other end of the same tube. Thus, water and lignin starts mixing at the beginning of the second tube, the mixing continuing to the end of the reactor. The tubes that participate on mixing form a mixing length of the reactor.

Figure 6:
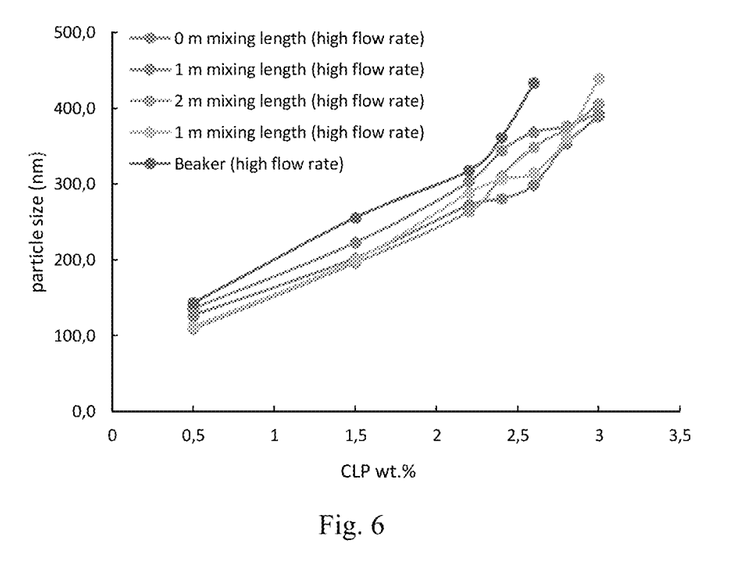
FIG. 6 is a graphical comparison of the particle size obtained at different CLP concentrations using continuous flow reactor and beaker set-up for high flow rate.
Figure 7:
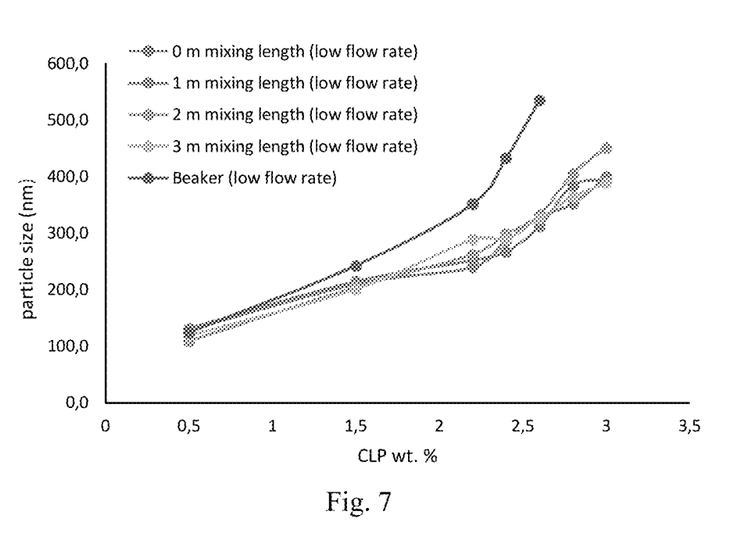
FIG. 7 is a graphical comparison of the particle size obtained at different CLP concentrations using continuous flow reactor and beaker set-up for low flow rate.

According to one embodiment, the lignin solution upon coming in contact with water begins to form colloidal lignin nanoparticles. After passing over the entire mixing length, a homogenous dispersion of colloidal nanoparticles is obtained. The mixing elements increase the residence time and create turbulence within the tubular reactor. This results in better mixing and less precipitation on the walls of the tubular reactor, leading to the formation of a more uniform colloidal dispersion at the outlet. Upon increasing the flow rate of water and lignin, it is seen that there is no significant change in the particle diameter of the CLPs as seen in FIGS. 6 and 7 respectively. Furthermore, increasing the mixing length did not result in any significant change in the particle diameter of the CLPs. With no mixing elements, there is visible precipitate on the walls of the tubular reactor, which is not the case when mixing elements are used.

The tubular reactor offers a relatively large surface area to volume ratio, which results in enhanced heat and mass transfer. In comparison to a conventional mixing reactor, there is very little variation in the mixing rate, which results in higher homogeneity. Furthermore, using a tubular reactor offers greater flexibility and ease of control. With a continuous flow tubular flow tubular reactor, it is possible to obtain a stable homogeneous dispersion with smaller particle size in comparison to a beaker set-up where in the CLPs are produced batch wise.

According to an embodiment a batch reactor can be used for the formation of uniform dispersions of colloidal lignin particles.

According to one embodiment the CLP dispersion at the outlet may contain up to 2.80 wt. % of lignin.

Thus, the method of the present invention is applicable to industrial environment for example using above described continuous flow tubular reactor.

According to one embodiment, colloidal lignin particles of the present invention can also be functionalized after the colloid formation for example by adsorption of a cationic polyelectrolyte.

According to one embodiment, after the formation of the colloidal lignin particles the organic solvents can either be recovered or the colloidal lignin particles can be concentrated by ultrafiltration. The order of these steps can be reversed, but influence the materials and equipment that can be used.

The recovery of organic solvents can be accomplished by any means known to the art, specifically, but not limited to distillation and rotary evaporation. When the recovery of the solvents is accomplished by distillation the distillation can be conducted without refluxing of the distillate, where an azeotropic fraction of water is collected alongside the organic solvents. More specifically, the distillation can be conducted in two or more stages, where distillate fractions with varying water content are collected.

When organic solvents are collected with rotary evaporation, the colloidal lignin particles do not affect the evaporation conditions in any significant manner over the evaporation of a mixture of water and organic solvents. Thus, the solvents can be collected with the means known to the art, with the fraction of water collected with the organic solvent being dependent on the pressure of the evaporation.

When organic solvents are collected with a distillation column, a number of equilibrium stages are required to allow for the water content of the distillate to be minimized. In this embodiment no reflux is required in the distillation column to achieve sufficient separation of the organic solvents from water. When distillation is conducted with two columns and the first column kept at slightly lower temperature than the second column, the distillate from the first column will contain the majority of the solvent, specifically but not limited to THF, with very little water. The bottom fraction with some of the organic solvents left can be distilled at a higher temperature, with a distillate having a higher water content than in the first distillation and the bottom fraction having no or very little organic solvents.

Furthermore, an entrainer can be used to break an azeotrope in distillation of the organic solvents. Such solvents are well known to those familiar with the art. Such solvents are 1,2-propanediol and 1,4-butanediol for THF-water separation and benzene for ethanol-water separation. An entrainer will both decrease the water content in the distillate and reduce the energy consumption of the distillation.

Additionally, the recovery of organic solvents from the colloidal lignin particles can be accomplished with a solvent recovery unit. The method is well known to those familiar with the art. Principally the method is specifically suitable for the recovery of solvents from non-dissolved substances, such as solvents and water from bitumen. As a flash unit is specifically built for extracting viscous substances, it is not prone to fouling, as a distillation unit would be, if colloidal lignin dispersion is directly fed into it.

The distillation of the solvent mixture by column can be conducted with colloidal lignin particles present in the mixture of solvents, but more preferably with the colloidal lignin particles having been separated from the mixture by any means known to the art, specifically, but not limited to industrial ultrafiltration.

In industrial ultrafiltration the aqueous phase, with or without organic solvents, is passed through an ultrafiltration membrane with applied pressure. In one embodiment the concentrate is mixed within the ultrafiltration device, preventing the clogging of the ultrafiltration membrane. In this embodiment, the input stream of the colloidal lignin particles is split into two output feeds. The permeate feed contains the aqueous phase with possible residual lignin passed through the ultrafiltration membrane. The concentrate feed contains the colloidal lignin particles in the aqueous phase. The concentration limit in this embodiment is governed by the viscosity of the concentrate. Specifically, when the applied pressure and mixing do not allow for the permeation of the aqueous phase through the membrane, the concentration limit has been reached.

Additionally, when the concentration of colloidal lignin particles is accomplished for an aqueous dispersion with organic solvents, the parts in contact with the dispersion have to be resistant to the solvent environment. More specifically, the membrane, seals and tubing or piping have to be resistant to the solvent environment. Materials capable of this are well known to those familiar with the art.

The drying of the colloidal lignin particles can be accomplished by any means known to the art, specifically, but not limited to, spray drying. In spray drying the concentrated aqueous colloidal lignin particles are fed into the spray dryer. In this embodiment a nebulizer produces a fine mist of colloidal lignin particles into a stream of hot air, at 180 degrees C. The hot air evaporates the water from the particle, producing a stream of dry lignin particles and stream of steam.

Furthermore, the heat of steam can be reused in the process, specifically in, but not limited to the recovery of solvents. The means to accomplish this are well known to those familiar with the art.

One embodiment provide a stable aqueous colloidal lignin particle dispersion concentrate, which exhibits a concentration lignin in the form of colloidal lignin particles of at least 10 wt. %, preferably 12 to 50 wt. %.

Another embodiment comprises removing from an aqueous dispersion of the above discussed kind a concentrate by removing at least a part, preferably at least 10% by weight, typically about 12 to 80% by weight of the water present in the aqueous dispersion.

Figure 4:
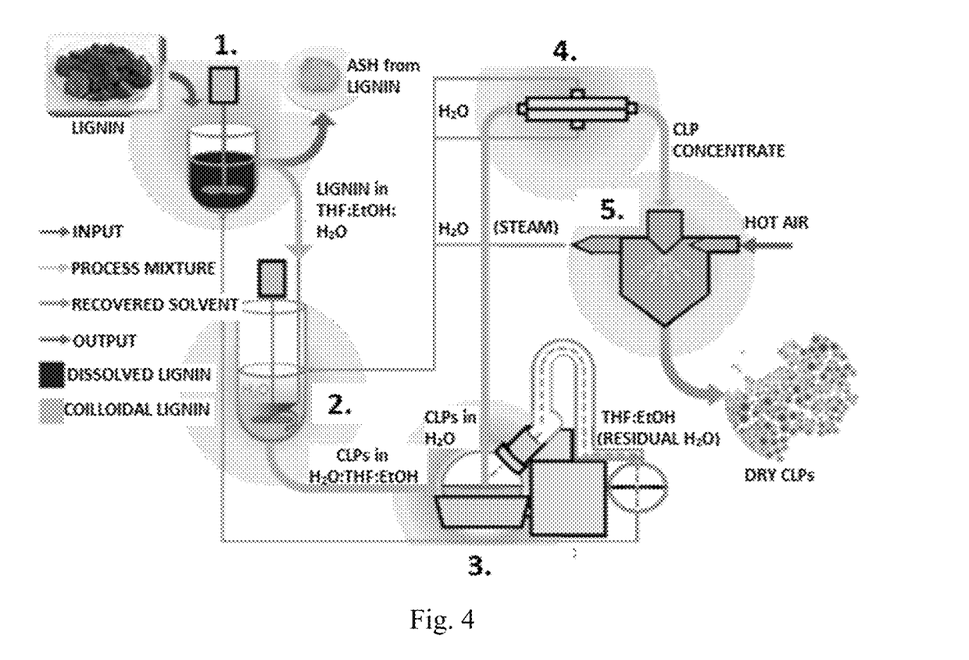
FIG. 4 shows the reuse of organic solvents and water in the method according one embodiment of the present invention.

The reuse of organic solvents and water are presented in FIG. 4. The recovered organic solvents can be used to dissolve lignin. The means for this are well known to those familiar with the art. Specifically recovered solvent mixture should contain as little water as possible. In this embodiment lignin is dissolved in a recovered solvent fraction containing less than 10 wt. % of water. Once lignin is dissolved, the solution can be diluted with a fraction of collected organic solvents with a higher water content. The aqueous phase recovered from solvent recovery and/or ultrafiltration and spray drying can be reused in the colloidal lignin particle formation. The aqueous phase can contain traces of lignin or organic solvents remaining in the recovered phase.

FIG. 4 shows a simplified process for producing stable colloidal dispersions of lignin and for recovery of solvent.

In the drawing, reference numeral 1 stands for lignin dissolution, numeral 2 stands for CLP formation, numeral 3 stands for evaporation, numeral 4 stands for ultrafiltration and numeral 5 stands for drying.

FIG. 4, a mixer 2 is used for the formation of uniform dispersion of colloidal particles. First lignin is dissolved 1 into a mixture of a primary solvent and a co-solvent. The solution thus obtained is conducted to the mixer 2 where it is fed into water to produce a dispersion under agitation. The solvent is then removed from the dispersion for example by evaporation 3, then the remaining solution/dispersion is conducted to filtration, e.g. ultrafiltration 4 and the thus obtained solid matter is spray dried 5 to recover lignin in the form of a powder of finely divided particles.

Most types of lignin contain a fraction of ask, in particular inorganic ash and carbohydrates and similar non-soluble matter. The removal of ash is possible, but not required, for this embodiment. When lignin is dissolved in organic solvents, specifically, but not limited to THF, the inorganic ash precipitates. The means to remove the precipitate from the dissolved lignin are well known to those familiar with the art. In this embodiment the dissolved lignin is separated from the ash by decanting the solution from one vessel to another.

Furthermore, the reuse of the aqueous phase is possible, but not required, for this embodiment. In the case where the colloidal lignin particles need to be recovered either in a diluted or a concentrated dispersion, more water can be added to the process to account for the water going into the colloidal lignin dispersion.

Additionally, the full reuse of organic solvents is possible, but not enquired, for this embodiment. The addition of more solvent into the process can be accomplished, if this is economically more feasible than the full recovery of organic solvents.

Furthermore other means of separating the colloidal lignin particles from the aqueous phase other than the ones stated above can be used. The means for this are well known to those familiar with the art. Methods for this are specifically, but not limited to, the precipitation by the increase of the salt content or the alteration of the pH of the dispersion.

The applications in which the colloidal lignin particles and the dried lignin particles can be used for include, but are not limited to, Pickering emulsions, composites, antibacterial formulations, adhesives, binders, coatings, flocculants, drug delivery, food processing and cosmetics.

An embodiment of an application with concentrated colloidal lignin particles is a Pickering emulsion. A "Pickering emulsion" is an emulsion stabilized by solid particles which adsorb onto the interface between two phases. When an aqueous dispersion of colloidal lignin particles were vortex mixed with 1:1 volume ratio of rapeseed oil an emulsion formed at concentrations as low as 0.1 wt. % colloidal lignin particles. An increase of the colloidal lignin particle concentration increased the stability of the emulsion.

One embodiment comprises modification by adsorption of cationic polymer or cationic lignin to provide amphiphilic particles to improve efficiency for Pickering emulsions.

According to one embodiment, the method of the present invention can be utilized in manufacture of adhesives wherein at least part of the phenol is replaced with lignin.

Colloidal lignin particles of the present invention are suitable to be used in adhesives due to its increased homogeneity compared to bulk lignin. The main obstacle for the replacement of phenol with lignin in adhesives is its much lower reactivity. Thus, if the lignin in the CLPs is polymerized before its application as an adhesive, the only reactions that need to occur in the curing of the adhesive are reactions at the CLP surface. Thus, with quite a low surface to volume ratio, with a modest amount of additional reagents, the CLPs can be rendered reactive and usable as wood adhesives.

According to one embodiment functionalization of colloidal lignin particles and adhesive formulation can be accomplished with the use of pH swing reactions. First, lignin is reacted into its sodium carboxylate/phenolate form with equimolar NaOH to acidic OH in the used lignin. This aqueous lignin carboxylate/phenolate solution has a lignin content of 26 wt. %, pH of ca. 10 and has the viscosity of honey. This concentrated solution is reacted with formaldehyde. As the sodium phenolate form of lignin is soluble in water, it cannot form CLPs. The methylated reaction product is neutralized with acid and washed to remove the sodium salt formed in the neutralization. After washing with water, the concentrated lignin precipitate is dissolved with a mixture of the solvent tetrahydrofuran (THF) and ethanol (EtOH), producing a mostly organic solution usable for CLP formation.

The methylolated lignin self-assembles into CLPs upon addition of the solution into water. CLPs can also be self-assembled from this solution upon the evaporation of the organic solvents. As with unfunctionalized lignin, according to one embodiment the CLP concentration can be about 2.8 wt. % or higher. For these methylolated CLPs to be functionalized, they need to be stable in alkaline pH of the reactions. Stabilization can be obtained by cross-linking which has to be conducted in acidic conditions, as CLPs will dissociate and dissolve at pH 9, where the reaction could take place.

The cross-linking of CLPs is accomplished in acidic conditions. In one embodiment the use of a minute amount (ca. 4 mg/g) of cationic polyelectrolyte converts the negative charge of the CLPs into positive. The positive CLPs are not aggregated even at pH 1, where cross-linking takes place. The CLP crosslinking is conducted at pH ca. 1 at 90° C. More preferably, the cross-linking is accomplished at a higher pH, where the CLPs do no aggregate. In one embodiment the pH of the CLPs is set to 2.0 and the cross-linking is conducted by heating at 50° C. for 4 h. After this, the CLPs retain their shape up to pH 11.4.

According to preferred embodiment the surface of the cross-linked CLPs is covered with all of the functional groups found in the methylolated lignin. However, as the CLP formation is governed by the amphiphilic nature of lignin, the CLP surface will have a higher concentration of carboxylic acid groups than the bulk lignin. The CLP surface will have methylol groups, but possibly less than would be estimated by the degree of methylolation of the bulk lignin. Thus, while there are reactive methylol groups on the CLP surface, their density can be insufficient to enable cross-linking of neighboring CLPs, even under compression.

According to one embodiment, in order to increase the reactivity of the CLP surface, the density of methylol groups has to be increased. For this, the CLPs can be further reacted with phenol-formaldehyde (PF) resin to create a relatively thin reactive layer. As PF resin is much more reactive than the CLPs, the reaction of CLPs and PF in acidic media would just condense the PF resin, without it reacting with CLPs. Thus, the pH of the CLPs need to be raised to a pH of ca. 10 where the condensation reaction with CLP takes place in a controlled manner. These particles are first activated either with a reaction with phenol in acidic pH, or with sodium phenolate in basic pH, after which they can be grafted with commercial PF resin.

As the CLPs are relatively large (ca. 200 nm in diameter), the thin layer of PF resin will be minimal in terms of adhesive mass. However, as the CLPs are already cross-linked, the only reaction required for the adhesive to work is the interparticle cross-linking of the CLPs, aided by the PF surface.

CLPs can be dense upon self-assembly and as such are not very compressible. However, upon an increase of pH, the CLPs can be swollen. The swollen particles can be more readily compressed, creating a fused honeycomb structure, which upon curing generates a fully interconnected polymer network.

Thus, according to an embodiment, in order to manufacture above described adhesives lignin is functionalized before or after (or both) the colloid formation.

EXAMPLES

Example 1

A 8.24 g solution of softwood Kraft lignin in a mixture of THF, ethanol and water with mass ratios of 38:32:30 wt. %, respectively was introduced into 18.87 g of stirred water. Colloidal lignin particles, with a mean average diameter of 230 nm (PDI 0.15) and a zeta potential of −38 mV were formed within seconds of mixing. The lignin concentration of this dispersion was 2.8 wt. % and the water content was 76 wt. % of the solvents.

Example 2

10 kg of 1.7 wt. % colloidal dispersion prepared according to Example 1, but with lower lignin concentration, was prepared. The particles had a mean average diameter of 230 nm and a zeta potential of −38 mV. This solution was loaded into a 20 L rotary evaporator at room temperature in order to evaporate THF and ethanol, yielding a fully aqueous dispersion of lignin colloids. The water bath temperature was 80° C. from the beginning and the pressure was lowered from 190 mbar to 120 mbar over 80 minutes. The vapor temperature of the distillate remained a near constant 49-50° C. for the duration of the distillation. The distillate was collected in two fractions. The first 2.7 L fraction had a solvent composition of 39:23:38 weight ratio of THF: ethanol: water and the second 0.6 L fraction had a 1:7:92 weight ratio of THF: ethanol: water.

Example 3

When the solvent recovery is simulated with an ASPEN process simulation program, a 5 stage distillation column, with a 13:11:76 weight ratio mixture of THF, ethanol and water feeded to the 3rd stage. When the bottom stage is at 64° C. and the reflux ratio set to minimum (0.01), a distillate with a 82:8:9 weight ratio of THF, ethanol and water is collected. When the bottom fraction of this distillation is feeded into a second 5 stage column into stage 3 and the bottom stage being at 76° C., a distillate with a 12:45:43 weight ratio of THF, ethanol and water is collected. The combined fractions have a 40:30:30 weight ratio of THF, ethanol and water. The bottom fraction has 6% of the ethanol, or 0.6 wt. % ethanol in water.

Thus, when using ASPEN simulation program, the distillate can be recovered in fractions. The first fraction consist majority of THF, with some ethanol and water. The second fraction consists the rest of THF and almost all the rest of ethanol. The solvent composition of combined fractions is 100 wt. % of the THF, 94 wt. % of the ethanol and 30 wt. % of water in the mixture.

Example 4

294 g lignin (200 g lignin solids) was dissolved in 982 g of solvent mixture emulating the first distillate fraction of the simulated data from Example 3. The inorganic ash precipitates from this solution and the solution is separated by decanting. This solution was further diluted with 1610 g of solvent mixture emulating the second distillate fraction of the simulated data from Example 3. The resultant lignin concentration and solvent composition was identical to that of Example 1. The solution produced identical colloidal lignin particles to those of Example 1, at least by z-average size, polydispersity and zeta potential.

Example 5

32 L of 2.8 wt. % aqueous dispersion of colloidal lignin particles was prepared according to Example 2. This Dispersion was concentrated with an OptiFilter ultrafiltration unit, using several membrane materials (RC, PS and PES). The device was operated at a steady pressure difference of 1.0 bar, with a rotor between the ultrafiltration membranes generating a turbulent flow, which keeps the membrane surface clean and increases the permeate flow through the membrane. A 14 wt. % colloidal lignin particle dispersion concentrate was obtained as the concentrate and a clear, slightly yellowish, permeate was collected. The concentrate was identical to the feed solution by z-average size, polydispersity and zeta potential. The permeate consisted of a minute amount of the original lignin.

Example 6

A 20 ml/min feed of 14 wt. % colloidal lignin concentrate from Example 5 was fed into a Mobile Minor Spray Dryer (Niro Atomizer, Denmark). The concentrated dispersion was sprayed into a chamber under flow of 180° C. air. Dry lignin particles were collected. A fraction of the particles were redispersed in water with almost no change in average particle size or zeta potential.

Example 7

Colloidal lignin particles from Example 5 were diluted to 0.1, 0.25, 0.5 and 1 wt. % concentrations (5 ml volume) and used to emulsify Rapeseed oil (5 ml) by vortex mixing and shaking the immiscible phases in a screw cork tubes during 30 s. Pickering emulsions were formed for each concentration, with increased emulsion stability as the colloidal lignin particle concentration rose from 0.1 to 1 wt. %.

Example 8

3.33 g of spray dried lignin particles from Example 6 and 6.66 g of PLA resin (InGeo 6060D from NatureWorks, USA) were added into a glass vial as two layers and heated to 170° C. in an oil bath. After 20 minutes, temperature was elevated to 190° C. resulting in the melting of the PLA beads. Lignin powder was mixed into the molted PLA with spatula. Sample was then then mixed occasionally during 1.5 h at 190° C. A small sample from the dark colored blend was taken with spatula and pressed between glass plates to produce a flat sample for AFM analysis. AFM showed the lignin particles to be well dispersed in the PLA matrix.

Example 9

Using a continuous flow reactor set-up as depicted in FIG. 5, dispersions of CLP were prepared. Table 1 gives the specifications of the tubular reactor.

TABLE 1

Tubular reactor specifications

| | |
|---|---|
| Number of tubes | 4 |
| Sampling points | 2 |
| Inlet points | 2 |
| Outlet | 1 |
| Peristaltic pumps | 2 |
| Safety Valves | 2 |
| Control Valves | 4 |
| Total tube length (m) | 4 |
| Mixing elements length (m) | 3 |
| Water flowrate (ml/min) | 230-350 |
| Lignin solution flowrate (ml/min) | 160-240 |

Table 2 gives a summary of the experimental details:

TABLE 2

| | | 1 m, 2 m & 3 m mixing lengths | | | | Beaker set-up | |
|---|---|---|---|---|---|---|---|
| | | High flow rate (mL/min) | | Low flow rate (mL/min) | | High flow rate | Low flow rate |
| Trial | CLP Wt. % | Water | Lignin | Water | Lignin | (RPM) | (RPM) |
| 1 | 3 | 349.2 | 240 | 232.8 | 160 | 1000 | 750 |
| 2 | 2.80 | 349.2 | 240 | 232.8 | 160 | 1000 | 750 |
| 3 | 2.6 | 349.2 | 240 | 232.8 | 160 | 1000 | 750 |
| 4 | 2.4 | 349.2 | 240 | 232.8 | 160 | 1000 | 750 |
| 5 | 2.2 | 349.2 | 240 | 232.8 | 160 | 1000 | 750 |
| 6 | 1.5 | 349.2 | 240 | 232.8 | 160 | 1000 | 750 |
| 7 | 0.5 | 349.2 | 240 | 232.8 | 160 | 1000 | 750 |

The lignin solution upon coming in contact with water begins to form colloidal lignin nanoparticles. After passing over the entire mixing length (3 m), a homogenous dispersion of colloidal nanoparticles is obtained. The mixing elements increase the residence time and create turbulence within the tubular reactor. This results in better mixing and less precipitation on the walls of the tubular reactor The CLP dispersions containing up to 2.8 wt. % lignin can be obtained without significant sedimentation. The tubular reactor offers a relatively large surface area to volume ratio, which results in enhanced heat and mass transfer. In comparison to a conventional mixing reactor, there is very little variation in the mixing rate, which results in more homogeneity. Furthermore, using a tubular reactor offers greater flexibility and ease of control.

It was observed that 3 m of mixing elements produced particularly good results by giving a homogenous dispersion without any significant sedimentation of particles.

The following embodiments are preferred:

1. A method of forming a concentrated solution of colloidal lignin particles, comprising a step of inserting a solution of lignin in a mixture of organic solvents into water.

2. The method according to embodiment 1, wherein the use of a co-solvent enables the increased concentration of colloids over the colloid formation without co-solvents.

3. The method according to embodiments 1 or 2, wherein formed colloidal lignin particle size can be altered with solvent environment and lignin concentration.

4. The method according to embodiments 1 to 3, wherein the organic solvents are recovered in fractions with lower and higher water content.

5. The method according to any embodiments 1 to 4, wherein lignin is dissolved in a recovered solvent fraction with a low water content and diluted with a recovered solvent fraction with a high water content.

6. The method according to any embodiments 1 to 5, where the inorganic ash, present in most types of lignin, is precipitated from the organic solution of lignin. The dissolved lignin can be separated from the precipitated ash.

7. The method according to any embodiments 1 to 6, wherein colloidal lignin particles are formed from lignin dissolved into recovered organic solvents with water.

8. The method according to any embodiments 1 to 7, where the colloidal lignin particles are concentrated with the use of an ultrafiltration device. The filtrate may consist of a mixture of water and solvents or of the water aqueous phase after the recovery of organic solvents. The filtrate may contain traces of lignin. The filtrate may be reused in the colloid formation process. The concentrate contains the formed colloidal lignin particles suspended either in a mixture of water and organic solvents or just water.

9. The method according to any embodiments 1 to 7, where colloidal lignin particles at whatever concentration, but preferably at over 10 wt. %, is dried by spray drying. Said dry particles may be dispersed in water or other suitable non-solvent by mechanical mixing or sonication.

10. The method according to any embodiments 1 to 9, where all of the used solvents and water can be reused in the process.

11. The method according to any embodiments 1 to 10, where said colloidal lignin particles are used to prepare Pickering emulsions. The colloidal lignin particles used for this may be dried and redispersed or at any concentration, which enables the formation of the Pickering emulsion with a suitable oil.

12. The method according to any embodiments 1 to 10, where said colloidal lignin particles are used to prepare composite materials.

INDUSTRIAL APPLICABILITY

The present technology can be applied to produce colloidal lignin particles, especially stable concentrated colloidal lignin particle dispersions. The colloidal lignin of the present invention can be utilized in different lignin comprising products in general. In particular, the present invention is applicable for formation of pH stable colloidal lignin in industrial scale without any significant cost, such as cost of cross-linking, that would limit its applications.

CITATION LIST

Patent Literature

WO2016020383 A1
EP 0429723 A1

Non-Patent Literature

Publication DOI: 10.1002/cphc. 201200537; 10.1039/c3gc42131g
Publication 10.1039/C5GC01436K.

The invention claimed is:

1. A stable aqueous colloidal lignin particle dispersion comprising at least 1.0 wt. % colloidal lignin particles of spherical shape, which have an average diameter below 400 nm dispersed in a mixture comprising at least two organic solvents and water,
   wherein the at least two organic solvents comprise at least one organic solvent which is miscible in water and capable of dissolving lignin at concentrations of at least 5 wt. % and at least one co-solvent, said at least one co-solvent miscible in water and capable of suppressing aggregation of the colloidal lignin particles, and wherein the lignin particles are kraft lignin particles.

2. The dispersion according to claim 1, wherein the at least two organic solvents have a lower boiling point than water, thereby enabling solvent recovery from the dispersion by distillation.

3. The dispersion according to claim 1, wherein a ratio of the water to the at least two organic solvents is at least 1:1.

4. The dispersion according to claim 3, wherein a ratio of the water to the at least two organic solvents is in a range of 3:2-7:1.

5. The dispersion according to claim 1, wherein the at least one co-solvent is selected from alcohols containing 1 to 10 carbon atoms.

6. The dispersion according to claim 1, wherein the mixture of at least two organic solvents comprises a cyclic ether and an alcohol containing 1 to 4 carbon atoms.

7. The dispersion according to claim 1, wherein the colloidal lignin particles comprise lignin in which at least a part of the phenolic groups thereof have been chemically modified.

8. The dispersion according to claim 7, wherein the colloidal lignin particles comprise methylolated lignin.

9. The dispersion according to claim 1, wherein a minimum water content of the dispersion is above 65 wt. %.

10. The dispersion according to claim 1, wherein a concentration of the colloidal lignin particles is 12 to 50 wt. % of the dispersion.

11. A concentrate obtained by removing at least at least 10% by weight of water from the dispersion according to claim 1.

12. The dispersion according to claim 1, wherein a ratio of the at least one organic solvent which is miscible in water and capable of dissolving lignin at concentrations of at least 5 wt. % to the at least one co-solvent is from 1:3 to 3:1.

13. The dispersion according to claim 12, wherein the at least one organic solvent which is miscible in water and capable of dissolving lignin at concentrations of at least 5 wt. % comprises a cyclic ether and the at least one co-solvent comprises an alcohol containing 1 to 4 carbon atoms.

14. A method of forming a dispersion of colloidal lignin particles, comprising:

mixing water with a mixture of at least two organic solvents having lignin dissolved therein to form the dispersion of colloidal lignin particles, wherein the dispersion comprises at least 1.0 wt. % colloidal lignin particles of spherical shape having an average diameter below 400 nm, wherein the at least two organic solvents comprise at least one organic solvent which is miscible in water and capable of dissolving lignin at concentrations of at least 5 wt. % and at least one co-solvent, said at least one co-solvent miscible in water and capable of suppressing aggregation of the colloidal lignin particles, and wherein the lignin particles are kraft lignin particles.

15. The method according to claim 14, wherein the mixture of the at least two organic solvents further comprises an amount of water, wherein the initial amount of water is less than that required to self-assemble the colloidal lignin particles in the mixture.

16. The method according to claim 14, wherein the at least two organic solvents comprise at least one organic solvent which is miscible in water and capable of dissolving lignin at concentrations of at least 5 wt. % and a co-solvent, and wherein the co-solvent comprises an alcohol having 1 to 10 carbon atoms.

17. The method according to claim 14, wherein a concentration of water in the dispersion is greater than 50 wt. %.

18. The method according to claim 14, further comprising concentrating the dispersion to form a concentrate, wherein the concentrate comprises the colloidal lignin particles suspended either in a mixture of water and the at least two organic solvents or in just the water.

19. The method according to claim 18, wherein the concentrate comprises the colloidal lignin particles at a concentration of at least 10 wt. % of the concentrate.

20. The method according to claim 14, further comprising preparing a Pickering emulsion from the dispersion of colloidal lignin particles and an oil, wherein the colloidal lignin particles are dried or redispersed to a concentration in the dispersion which enables formation of the Pickering emulsion with the oil.

21. A stable aqueous colloidal lignin particle dispersion comprising at least 1.0 wt. % colloidal lignin particles of spherical shape, which have an average diameter below 400 nm dispersed in a mixture comprising at least two organic solvents and water, wherein the at least two organic solvents comprise at least one organic solvent which is miscible in water and capable of dissolving lignin at concentrations of at least 5 wt. % and at least one co-solvent, said at least one co-solvent miscible in water and capable of suppressing aggregation of the colloidal lignin, and wherein a ratio of the at least one organic solvent which is miscible in water and capable of dissolving lignin at concentrations of at least 5 wt. % to the at least one co-solvent is from 1:3 to 3:1.

\* \* \* \* \*